United States Patent
Andrieu et al.

(10) Patent No.: US 6,853,787 B2
(45) Date of Patent: Feb. 8, 2005

(54) SILICA OPTICAL FIBER WITH A DOUBLE POLYMER CLADDING

(75) Inventors: Xavier Andrieu, Bretigny sur Orge (FR); Anne Decaumont, Bretigny sur Orge (FR); Laurent Gasca, Villebon sur Yvette (FR)

(73) Assignee: Alcatel, Paris (FR)

(*) Notice: Subject to any disclaimer, the term of this patent is extended or adjusted under 35 U.S.C. 154(b) by 86 days.

(21) Appl. No.: 10/244,506

(22) Filed: Sep. 17, 2002

(65) Prior Publication Data

US 2003/0059187 A1 Mar. 27, 2003

(30) Foreign Application Priority Data

Sep. 27, 2001 (FR) .............................. 01 12447

(51) Int. Cl.⁷ .............................. G02B 6/02; G02B 6/22
(52) U.S. Cl. ...................... 385/127; 385/125; 385/126; 385/128
(58) Field of Search ................. 385/122–126, 385/141, 143, 145

(56) References Cited

U.S. PATENT DOCUMENTS

| | | | | |
|---|---|---|---|---|
| 4,701,614 A | * | 10/1987 | Jaeger et al. | 250/227.14 |
| 5,121,460 A | * | 6/1992 | Tumminelli et al. | 385/126 |
| 5,181,268 A | * | 1/1993 | Chien | 385/128 |
| 5,497,442 A | * | 3/1996 | Roos et al. | 385/128 |
| 5,696,863 A | * | 12/1997 | Kleinerman | 385/123 |
| 5,966,491 A | | 10/1999 | DiGiovanni | |
| 6,304,705 B1 | * | 10/2001 | Kalish et al. | 385/128 |
| 6,411,762 B1 | * | 6/2002 | Anthon et al. | 385/123 |
| 6,625,363 B2 | * | 9/2003 | Carter et al. | 385/127 |
| 6,775,443 B2 | * | 8/2004 | Bringuier et al. | 385/128 |

FOREIGN PATENT DOCUMENTS

| | | |
|---|---|---|
| EP | 0 883 001 A1 | 12/1998 |
| WO | WO 01/38244 A1 | 5/2001 |

OTHER PUBLICATIONS

Patent Abstracts of Japan, vol. 007, No. 260 (P–237), Nov. 18, 1983 & JP 58 142304 A (Fujitsu KK), Aug. 24, 1983.
Patent Abstracts of Japan, vol. 1999, No. 05, May 31, 1999, and JP 11 052162 A (Mitsubishi Cable Ind. Ltd., Mitsubishi Electric Corp.) Feb. 26, 1999.

* cited by examiner

*Primary Examiner*—Joseph Williams
*Assistant Examiner*—Peter Macchiarolo
(74) *Attorney, Agent, or Firm*—Sughrue Mion, PLLC

(57) ABSTRACT

An optical fiber comprises a silica multimode optical core having a refractive index $n_1$ and at least one polymer optical cladding having a refractive index $n_2$, with $n_1 > n_2$. It further comprises a heterogeneous polymer intermediate optical cladding situated between the multimode core and the optical cladding and having a refractive index substantially equal to the refractive index $n_1$ of the multimode core.

10 Claims, 1 Drawing Sheet

FIG_1
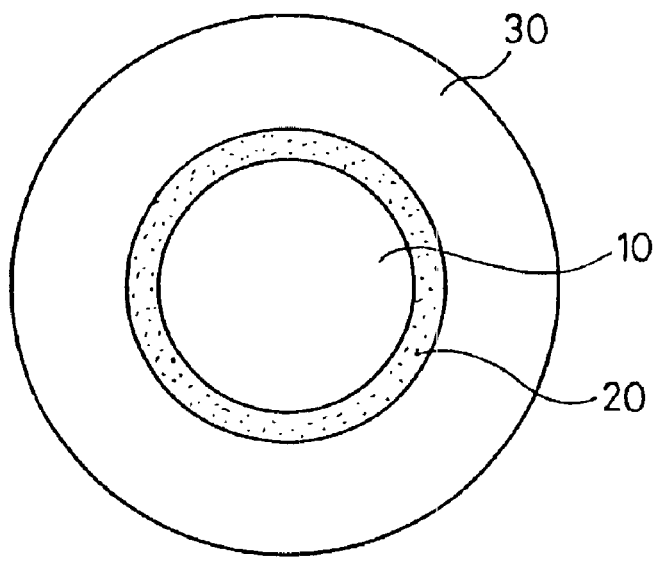
FIG_2
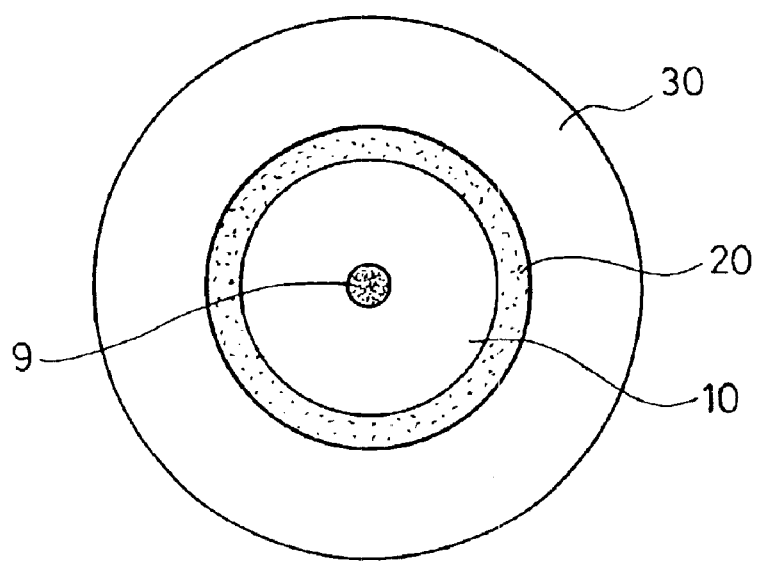

SILICA OPTICAL FIBER WITH A DOUBLE POLYMER CLADDING

CROSS-REFERENCE TO RELATED APPLICATIONS

This application is based on French Patent Application No. 01 12 447 filed Sep. 27, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to optical fibers used to transmit and/or amplify optical signals.

2. Description of the Prior Art

An optical fiber conventionally comprises a core surrounded by optical cladding and protected by a covering. The function of the core is to transmit, and possibly to amplify, an optical signal, and the function of the optical cladding is to confine the optical signal within the core. To this end, the refractive indices $n_1$ of the core and $n_2$ of the cladding are such that $n_1 > n_2$.

Optical fibers used for transmission can have a monomode core for propagating a single optical signal or a multimode core for propagating a plurality of optical signals simultaneously. The monomode or multimode character of an optical fiber depends essentially on its core diameter. Multimode transmission fibers are advantageously used for short-haul applications at moderate bit rates, i.e. with a narrow bandwidth.

Various existing types of transmission fibers satisfy different optical property criteria such as bandwidth and attenuation, cost, fabrication constraints, etc. Depending on the applications, it may be particularly important to favor the transmission of data with a wide bandwidth (high bit rate) or to guarantee limited attenuation (long-haul transmission).

Attempts have been made to increase the bandwidth by producing graded index fibers, for example, or by producing fibers with a polymer optical cladding around a silica core, known as polymer-clad silica fibers (PCSF), although in the case of a PCSF performance is limited to around 100 MHz.km.

There are also plastics material optical fibers, i.e. fibers whose core is made from a plastics material, and which have the particular feature of a very wide bandwidth. For example, the "Lucina" fiber from Asahi Glass has a bandwidth in excess of 500 MHz.km, compared to approximately 100 MHz.km for a graded index silica fiber. However, this kind of plastics material fiber has a high attenuation, of the order of 50 dB/km to 100 dB/km, compared to 5 dB/km to 10 dB/km for a PCS fiber as previously described. Furthermore, this kind of plastics material optical fiber is costly and ages badly.

The object of the present invention is to propose a new optical fiber structure that achieves a compromise between the advantages of PCS fibers and plastics material fibers.

In particular, the bandwidth of plastics material fibers is improved by defects in the polymer constituting the multimode core of the fiber, these defects generating mode changes in the transmitted optical signals.

On the other hand, the plastics material strongly attenuates the intensity of the transmitted signal, which is unacceptable in high-power applications such as amplifying fibers or long-haul transmission fibers.

To this end the invention proposes an optical fiber comprising a double plastics material cladding surrounding a silica core. Thus mode coupling is assured by an intermediate cladding with non-homogeneous portions and whose refractive index is substantially equal to that of the core. The second optical cladding assures the conventional function of optically guiding the signal.

Moreover, so-called "cladding-pumped" optical fibers are used for amplification and generally have two concentric cores: a monomode central core consisting of an amplifier medium and intended to propagate a single optical signal to be amplified, and a multimode core around the monomode core, used to propagate a pumping wave. Optical cladding surrounds the multimode core. The refractive index is highest in the central core and lowest in the cladding. Thus the two concentric cores behave like waveguides.

An amplifier optical fiber operates on the principle known as stimulated emission, whereby a material can emit a light wave of the same wavelength and with the same phase as the transmitted light wave because of excitation of the material by means of a high-energy light source, typically a pumping laser whose wavelength is shorter than that of the signal transmitted in the fiber. The main amplifier materials used are ions of rare earths such as erbium or ytterbium, for example, and are generally integrated into the monomode central core of the fiber as dopants.

The pumping beam is conventionally emitted by an injection laser adapted to emit a high-power beam. The pumping beam propagates in the multimode core of the optical fiber and regularly passes through the monomode core. The interaction between the pump and the amplifier medium, on the one hand, and between the signal and the amplifier medium, on the other hand, amplifies the signal. The signal beam is thus amplified optically by population inversions due to absorption of the pumping beam by the amplifier material of the central core.

The efficacy of amplification is directly related to the efficacy of pumping, which is essentially conditioned by the efficacy of the coupling between the monomode core and the multimode core.

Now, one of the problems that arises with cylindrical concentric cores is that some light rays conveyed by the multimode core follow a helical trajectory around the monomode core without ever penetrating it, i.e. without ever passing through the amplifier material. The energy carried by these rays is therefore injected into the fiber in vain, because it is never used to amplify the signal transported in the monomode core.

Accordingly, pumped optical fibers generally include a particular structure which enables them to accept more optical pumping power and thereby increase the amplification of the optical signal which is obtained by absorption of energy. For example, in an attempt to solve this problem, it has already been proposed, in particular in the patent U.S. Pat. No. 5,966,491, to form longitudinal grooves in the external surface of the multimode core, in order to break up the helical trajectories of the light rays and to force them to encounter the interface of the monomode core.

Providing an irregular geometry interface between the multimode core and the optical cladding is also known in the art, as described in the patent application WO 01/38244, in order to modify the trajectories of the optical signals and cause mode changes or to introduce solid particles into the optical cladding, as described in the patent application EP 1

072 911 A1, in order to interfere mechanically with the trajectories of the light rays of signals propagating in the multimode core.

The present invention proposes another solution for increasing mode coupling in an amplifier optical fiber.

SUMMARY OF THE INVENTION

To this end, the invention proposes an optical fiber comprising a double plastics material cladding surrounding the core. Accordingly, the mode coupling is assured by an intermediate cladding having non-homogeneous portions and whose refractive index is substantially equal to that of the multimode core. The second optical cladding assures the conventional function of optically guiding signals in the multimode core. The disturbances introduced into the intermediate cladding are optical disturbances. The index of the intermediate cladding is in effect substantially equal to that of the multimode core, so that the optical signals from the multimode core will also propagate in the intermediate cladding, but the non-homogeneous portions of that cladding induce local refractive index variations that modify the optical propagation modes of the signals of the multimode core.

The present invention relates more particularly to an optical fiber comprising a silica multimode optical core having a refractive index $n_1$ and at least one polymer optical cladding having a refractive index $n_2$, with $n_1 > n_2$, which fiber is characterized in that it further comprises a heterogeneous polymer intermediate optical cladding situated between the multimode core and the optical cladding and having a refractive index substantially equal to the refractive index $n_1$ of the multimode core.

According to one feature the intermediate optical cladding has a thickness less than or equal to 10 µm.

In different embodiments the heterogeneous polymer intermediate optical cladding is made from an intrinsically non-homogeneous polymer having local density variations, such as acrylate polyurethane networks, or an alloy and/or a mixture of different polymers, or interpenetrating or semi-interpenetrating polymer networks, or a polymer containing transparent organic or inorganic particles.

In one application the optical fiber according to the invention comprises a silica monomode central core with a refractive index n0 surrounded by a silica multimode core with a refractive index n1, with n0>n1, and constitutes an optical amplifier, the monomode central core being doped with an amplifier material.

The features and advantages of the present invention will become more clearly apparent on reading the following description, which is given by way of illustrative and non-limiting example and with reference to the accompanying drawing.

BRIEF DESCRIPTION OF THE DRAWING

FIG. 1 shows in diagrammatic cross section a transmission optical fiber according to the invention.

FIG. 2 shows in diagrammatic cross section an amplifier optical fiber according to the invention.

DETAILED DESCRIPTION OF THE PREFERRED EMBODIMENT

The structure of the optical fiber proposed by the present invention can be applied to a multimode transmission optical fiber or to an amplifier optical fiber.

This kind of fiber in effect comprises a silica multimode optical core 10 having a refractive index $n_1$ and a polymer optical cladding 30 having a refractive index $n_2$, with $n_1 > n_2$. According to one essential feature of the invention, the fiber further comprises a heterogeneous polymer intermediate optical cladding 20, situated between the multimode core 10 and the cladding 30, and having a refractive index substantially equal to the refractive index $n_1$ of the multimode core.

The optical signals propagating in the multimode core 10 will penetrate into the intermediate cladding 20 because the refractive index $n_1$ is the same; the intermediate cladding 20 does not act as a waveguide.

The thickness of the intermediate optical cladding 20 must be intentionally limited to avoid specific propagation of one or more optical modes of the signal. For example, the intermediate polymer cladding advantageously has a thickness less than or equal to 10 µm.

The intermediate optical cladding 20 is made of a heterogeneous polymer, i.e. it includes non-homogeneous portions causing optical mode changes in the signals that pass through it. The non-homogeneous portions of the intermediate cladding 20 are non-homogeneous portions that induce essentially optical effects by locally varying the refractive index $n_1$.

In a first embodiment, the intermediate cladding 20 can be made from an intrinsically non-homogeneous polymer with local density variations, for example. Acrylate polyurethane networks, for example, have hard clusters in their natural structure which induce density variations and therefore refractive index variations. These clusters are generally distributed randomly in the polymer matrix and can be large enough, i.e. ¹⁄₂₀ the wavelength of the transmitted signal, to cause refraction of light. The quantity and the size of the clusters can be adjusted by the person skilled in the art by varying the compositions of the resins used to prepare the polymer of the intermediate cladding 20.

In a feasible second embodiment, the heterogeneous polymer intermediate optical cladding 20 can be made from an alloy and/or a mixture of different polymers. This kind of mixture can be implemented at the nanometer or micrometer level, depending on the polymers chosen by the person skilled in the art for making the intermediate cladding.

In another embodiment that can be envisaged, the heterogeneous polymer intermediate optical cladding 20 can be made from a polymer containing transparent organic or inorganic particles whose nature, quantity and size can be determined by the person skilled in the art as a function of the applications.

In a further feasible embodiment, the heterogeneous polymer intermediate optical cladding 20 can be made from interpenetrating polymer networks (IPN) or semi-interpenetrating polymer networks (SIPN). An interpenetrating network corresponds to a macromolecular assembly of at least two partly interlaced polymer networks and a semi-interpenetrating network corresponds to a macromolecular assembly of at least one polymer network with at least one linear chain.

These examples of the composition of the heterogeneous polymer intermediate cladding are given by way of illustrative example only, and other heterogeneous compositions can be envisaged, such as polymers in solutions or in emulsions or thermoplastics materials, for example.

The examples described hereinabove of producing the intermediate cladding 20 nevertheless have the advantage that they hardly modify the conventional fabrication processes for optical fibers that already use polymers of the above kind to coat the fibers. Simply adding a supplementary die produces the intermediate cladding on-line during drawing of the optical fiber.

The intermediate optical cladding 20 defined in the present invention advantageously improves the coupling of the optical modes propagating in the multimode core 10. In effect, the optical defects in the heterogeneous polymer intermediate cladding 20, whether occurring naturally or intentionally introduced, caused no changes in the propagation of the optical signals transmitted by the multimode core 10.

Accordingly, in the case of an application to transmission optical fibers, such changes of the optical modes of propagation of the signals will lead to a widening of the transmission bandwidth, without seriously degrading the attenuation of the optical signals transmitted. In effect, the core of the fiber, in which most of the luminous energy propagates, is made of silica, which has very good properties in terms of attenuation. A fiber of the above kind is particularly adapted to access network applications or transmission at high bit rates over medium distances.

Similarly, in the case of an application to amplifier optical fibers, i.e. in the situation in which the multimode core 10 surrounds a monomode core 9 doped with an amplifier material, such changes in the optical modes of propagation of the signals will lead to an improvement in the efficacy of the coupling between the monomode core and the multimode core.

What is claimed is:

1. An optical fiber comprising a silica multimode optical core having a refractive index $n_1$ and at least one polymer optical cladding having a refractive index $n_2$, with $n_1 > n_2$, the optical fiber further comprising a heterogeneous polymer intermediate optical cladding situated between said multimode core and said optical cladding and having a refractive index substantially equal to said refractive index $n_1$ of said multimode core.

2. The optical fiber claimed in claim 1, wherein said intermediate optical cladding has a thickness less than or equal to 10 µm.

3. The optical fiber claimed in claim 1, wherein said heterogeneous polymer intermediate optical cladding is made from an intrinsically non-homogeneous polymer having local density variations.

4. The optical fiber claimed in claim 3, wherein said heterogeneous polymer intermediate optical cladding is made from acrylate polyurethane networks.

5. The optical fiber claimed in claim 1, wherein said heterogeneous polymer intermediate optical cladding is made from an alloy and/or from a mixture of different polymers.

6. The optical fiber claimed in claim 1, wherein said heterogeneous polymer intermediate optical cladding is made from interpenetrating or semi-interpenetrating polymer networks.

7. The optical fiber claimed in claim 1, wherein said heterogeneous polymer intermediate optical cladding is made from a polymer containing transparent organic or inorganic particles.

8. The optical fiber claimed in claim 1, comprising a silica monomode central core with a refractive index $n_0$ surrounded by a silica multimode core with a refractive index $n_1$, with $n_0 > n_1$.

9. The optical fiber claimed in claim 8, constituting an optical amplifier, said monomode central core being doped with an amplifier material.

10. An optical fiber comprising a silica multimode optical core having a refractive index $n_1$ and at least one polymer optical cladding having a refractive index $n_2$, with $n_1 > n_2$, the optical fiber further comprising a heterogeneous intermediate optical cladding situated between said multimode core and said optical cladding and having a refractive index such that intermediate optical cladding does not act as a waveguide from multimode optical core.

* * * * *